United States Patent Office 3,379,781
Patented Apr. 23, 1968

3,379,781
CONVERSION OF ACYCLIC TRIENE COMPOUNDS
Ernest A. Zuech, Donald L. Crain, and Roger F. Kleinschmidt, Bartlesville, Okla., assignors to Phillips Petroleum Company, a corporation of Delaware
No Drawing. Filed June 27, 1966, Ser. No. 560,818
10 Claims. (Cl. 260—666)

The invention relates to the conversion of acyclic triene compounds. In one aspect, this invention relates to the cyclization of branched and straight chain acyclic triene compounds. In another aspect, this invention relates to the isomerization of acyclic triene compounds. In still another aspect, this invention relates to catalyst systems for converting acyclic triene compounds. A further aspect of the invention relates to processes for isomerizing and cyclizing acyclic triene compounds.

According to this invention, branched and straight chain acyclic triene compounds are converted by contacting them with a catalyst system comprising an amino alkali metal compound. The amino alkali metal catalyst system is the salt formed by contacting the suitable alkali metal with ammonia, a monoamine, or a diamine. In one embodiment of the invention, an acyclic triene compound is cyclized to the corresponding cyclodiene compound. In another embodiment of the invention, an acyclic triene compound is isomerized to produce an acyclic triene isomer of the starting material.

The preceding conversion reactions can be effected with an acyclic triene compound starting material containing 7 to 12 carbon atoms per molecule, inclusive, by means of a suitable amino alkali metal catalyst under converting conditions in a conversion zone. The reaction product produced contains the same number of carbon atoms per molecule as the acyclic triene compound starting material. Suitable amino alkali metal catalysts which can be used in the conversion process of this invention are characterized by the following structural formulas:

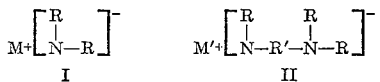

wherein M is an alkali metal selected from the group consisting of sodium and potassium and when M is potassium, the acyclic triene compound starting material contains hydrocarbon branches; M' is an alkali metal selected from the group consisting of lithium, sodium, and potassium; each R can be the same or different and is selected from the group consisting of a hydrogen atom and alkyl, aralky, cycloalkyl, alkylcycloalkyl, and cycloalkylalkyl radicals containing 1 to 10 carbon atoms and which can form a heterocyclic ring with the nitrogen atom to which they are attached; R' is selected from the group consisting of alkylene radicals having 2 to 12 carbon atoms, cycloalkylene radicals having 4 to 12 carbon atoms, and dialkylene substituted aromatic radicals having 8 to 20 carbon atoms; and recovering the compound containing the same number of carbon atoms per molecule as the acyclic starting material.

In a specific embodiment of the invention, when the catalyst is an aminosodium compound represented by Formula I, the acyclic triene compound starting material will cyclize to a cyclodiene containing the same number of carbon atoms per molecule as the acyclic triene starting material. In a modification of this embodiment, when the acyclic triene compound starting material contains 8 or more carbon atoms per molecule and an aminosodium catalyst represented by Formula I is used, the reaction product is a cycloheptadiene having one or more alkyl substituents containing the same number of carbon atoms which was in excess of 7 in the acyclic triene starting material. Thus, for example, when the acyclic triene starting material is octatriene, the reaction product formed is methylcycloheptadiene.

In another specific embodiment of the invention, when an aminopotassium compound catalyst represented by Formula I is employed and the acyclic triene compound starting material contains hydrocarbon branches, the reaction product formed is a cyclodiene compound containing 7 carbon atoms in the ring and one or more alkyl substituents containing the same number of carbon atoms in excess of 7. The hydrocarbon branches of the starting material will be in a substituted position on the ring of the cycloheptadiene reaction product.

In still another specific embodiment of the invention, when the catalyst is a sodium salt of a diamine as represented by Formula II and the acyclic triene starting material is straight or branched chain with 7 or more carbon atoms per molecule, the reaction product is, in the case of the straight chain triene, a cycloheptadiene having one or more alkyl substituents containing the same number of carbon atoms which was in excess of 7 in the straight chain starting material.

Accordingly, it is an object of this invention to convert acyclic triene compounds. Another object of this invention is to convert acyclic triene compounds containing hydrocarbon branches. A further object of this invention is to cyclize acyclic triene compounds. Another object of this invention is to cyclize acyclic triene compounds having hydrocarbon branches. Still another object of this invention is to isomerize acyclic triene compounds. A still further object of this invention is to provide a catalyst system for converting acyclic triene compounds. These and other objects of the invention will become apparent to one skilled in the art after studying the following detailed description and the appended claims.

In the practice of this invention, the acyclic triene compound starting material containing 7 to 12 carbon atoms per molecule, inclusive, is converted to a compound containing the same number of carbon atoms per molecule as the starting material. This is accomplished by contacting the acyclic triene compound under converting conditions in a conversion zone with a suitable catalyst selected from the group consisting of alkali metal salts of monoamines and diamines. Specific amino alkali metal catalysts within this group and the scope of the structural Formulas I and II include: methylaminolithium; ethylaminosodium; cyclohexylaminopotassium; dicyclohexylaminosodium; butylaminolithium; 2-aminoethylaminopotassium; piperidinosodium; 6-aminohexylaminolithium; sodium amide; lithium amide; morpholinosodium; piperazinolithium; 4-aminobutylaminolithium; diethylaminopotassium; N-methylethylaminosodium; dibutylaminolithium; 2-phenylethylaminosodium; N-methyl(4-phenyl) n-butylaminosodium; di(4-tert-butyl)cyclohexylaminolithium; 3-cyclohexyl-n-butylaminopotassium; 12-amino-1-dodecylaminosodium; 3-amino-1-cyclobutylaminolithium; 6-amino-1-cyclodecylaminosodium; 4-(aminomethyl)benzylaminosodium; and 2-methyl-2[4'(1,1-dimethyl-2-aminoethyl)biphenyl]propylaminosodium.

The sodium salts of the monoamine represented by Formula I for cyclizing the acyclic triene starting material include: sodium amide; ethylaminosodium; dimethylaminosodium; cyclohexylaminosodium; piperidinosodium; dicyclohexylaminosodium; and the like.

The sodium salts of the diamines represented by Formula II for cyclizing the acylic starting materials include: 4-aminobutylaminosodium; 6-aminohexylaminosodium; 2-aminoethylaminosodium; 4-aminocyclohexylaminosodium; and the like.

Specific potassium salts of the monoamines and diamines represented by Formulas I and II, respectively, for cyclizing the acyclic triene compounds having hydrocarbon branches include: diethylaminopotassium; dibutylaminopotassium; 2-aminoethylaminopotassium; 6-aminohexylaminopotassium; 3 - aminopropylaminopotassium; 2-aminopropylaminopotassium; potassium amide; and the like.

The lithium salts of the diamines which are illustrated by Formula II and which can be used to cyclize and isomerize the acyclic triene starting material include: 2-aminoethylaminolithium; 3-amino-1-propylaminolithium; 2-amino-1-propylaminolithium; 4-amino - 1 - cyclohexylaminolithium; and the like.

The alkali metal salt catalysts of this invention can be prepared by any suitable technique or method known to those skilled in the art. For example, the alkali metal can be directly reacted with the monoamine or diamine under conditions which will promote formation of the corresponding alkali metal amide. For example, in the preparation of diethylaminopotassium catalyst within the scope of Formula I, metallic potassium can be contacted with diethylamine in n-heptane at a temperature within the range of about 30 to about 115° C. for a period of time sufficient to obtain a reaction between the metal and the amine.

Exemplary acyclic triene compound starting materials containing 7 to 12 carbon atoms per molecule which can be converted by cyclization and/or isomerization in the practice of this invention are illustrated by the following structural formulas:

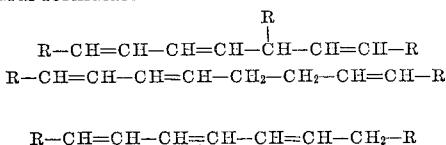

and

R—CH=CH—CH=CH—CH=CH—CH₂—R wherein each R can be the same or different and is selected from the group consisting of hydrogen and straight or branched chain alkyl radicals such that the total number of carbon atoms in the acyclic triene starting material is within the range of 7 to 12, inclusive.

Exemplary triene compounds within these formulas include: 1,3,5-heptatriene; 1,3,6-heptatriene; 1,3,5-octatriene; 1,3,6-octatriene; 1,3,7-octatriene; 2,4,6-octatriene; 1,3,5-nonatriene; 3-methyl-1,4,6-heptatriene; 3,6,8-dodecatriene; 5-methyl-3,6,8-undecatriene; 3-n-pentyl-1,4,6-heptatriene; 1,3,7-dodecatriene; 1,3,5-decatriene; 4,6,8-dodecatriene; 1,3,7-undecatriene; and 5-ethyl-1,3,6-octatriene.

In the practice of this invention, the concentration of the alkali metal amide catalyst can be within a broad range. It is generally preferred to conduct the reaction with a mole ratio of the amino alkali metal catalysts to the acyclic triene starting material in the range of about 0.001:1 to about 1:1. Concentrations outside of this range can be used if desired.

The reaction can be carried out in the presence of a solvent which is normally liquid at ambient temperature and at substantially atmospheric pressure. Solvents which can be used for this purpose include amines, saturated cyclic and acyclic hydrocarbons, and aromatic hydrocarbons. Exemplary amines which can be used for this purpose include ammonia, methylamine, diethylamine, tri-n-butylamine, N-methyl-N-ethyloctylamine, di - n-propylamine, n-hexylamine, n-decylamine, tert-octylamine, ethylenediamine, piperidine, morpholine, N,N-dimethylaniline, N-methylpiperidine, and the like. Examples of saturated cyclic and acyclic hydrocarbons and aromatic hydrocarbons which can be used as a solvent for the reactants of the invention include n-pentane, n-hexane, cyclohexane, heptane, decane, n-dodecane, benzene, toluene, isooctane, butylcyclohexane, and the like.

The reaction of the invention is generally carried out at a temperature within the range of about 10 to about 350° C. for a period of time varying from a few seconds, such as one second, to several hours, such as 48 hours, preferably for a period of time within the range of about 10 minutes to about 24 hours or more. The actual reaction time used will be governed by such factors as catalyst concentration, catalyst activity, and reaction temperature. The reaction can be conducted in the liquid phase at substantially atmospheric pressure. Superatmospheric pressures can be used if desired or necessary to maintain the liquid phase condition. The reaction can be conducted batchwise or continuous.

The cyclized and isomerized triene compound reaction products of this invention have utility for producing homopolymers and copolymers with other unsaturated organic compounds. These polymers can be formed into useful products such as, for example, sheets, films, and the like. The cyclized products of the invention are particularly useful as chemical intermediaries in the preparation of more complex organic compounds.

The following examples will further illustrate the invention. It must be understood that these examples are for this purpose only and are not considered limiting of the invention.

Example I

A three-necked flask equipped with a stirrer, condenser, thermometer, and dropping funnel was first charged with 100 milliliters of dry cyclohexane solvent and then 1.6 grams (0.016 mole) of phenylsodium suspended in 5 milliliters of heptane. The flask was then charged with 4.3 grams (0.05 mole) of piperidine. The contents of the flask was then heated to slow reflux to promote formation of the catalyst, piperidinosodium. After a few minutes a 31-gram mixture of acyclic isomeric octatrienes was added dropwise to the flask. The temperature of the flask was adjusted to maintain refluxing conditions during the addition of the mixture. The mixture had been previously analyzed by GLC (gas-liquid chromatography) on a ten-foot silicone oil column and found to contain 90 weight percent 1,3,6-octatriene, 9 weight percent 1,3,7-octatriene, and 1 weight percent vinylcyclohexane as impurity. This corresponds to 27.1 grams (0.25 mole) of the 1,3,6-octatriene isomer and 2.8 grams (0.026 mole) of the 1,3,7-octatriene isomer in the mixture. Refluxing was continued for approximately 5 hours and 15 minutes after all of the octatrienes had been added. Small samples were removed for analysis beginning immediately after the addition of the octatrienes was complete. A GLC aanlysis of the first sample indicated that 66 percent conversion to methylcycloheptadiene was obtained. At the termination of the run, the reaction mixture was cooled, hydrolyzed with water, and the resulting organic layer separated and distilled at a pressure of 100 millimeters of mercury. Fractions boiling between 72 and 80° C. and between 80 and 81.5° C. at this pressure were recovered and analyzed. A 20.5-gram mixture of isomers of methylcycloheptadiene was recovered. This represents a 66 percent yield based on the octatrienes charged.

Example II

The equipment used in Example I was employed including the method of forming the piperidinosodium catalyst, but without cyclohexane. The reaction flask containing the catalyst, cooled in a water bath, was then charged with a 53.8-gram mixture of isomeric octatrienes dropwise. The mixture was previously analyzed by GLC and found to contain 83 weight percent 1,3,6-octatriene, 14 weight percent 1,3,7-octatriene, and 3 weight percent vinylcyclohexane impurity. This corresponds to 44.65 grams (0.41 mole) 1,3,6-octatriene and 7.5 grams (0.069 mole) 1,3,7-octatriene isomer in the mixture. Small samples were removed periodically as in Example I and although heat was added to promote the reaction, analysis of these samples indicated that the reaction had been substantially completed before the mixture was heated. The reaction mixture was hydrolyzed with water and the organic phase was extracted with about 100 milliliters of normal heptane solvent. The organic layer was removed and distilled at a pressure of about 100 millimeters of mercury. The fraction recovered between 79 and 82° C. at this pressure was analyzed by GLC and found to comprise a mixture of isomers of methylcycloheptadiene. The total fraction recovered was 32.7 grams. This represents a 61 percent yield based on the octatriene charge.

Example III

The three-necked flask described in Example I was successively charged with 60 milliliters of dry cyclohexane, 1.6 grams (0.016 mole) of phenylsodium and 4.38 grams (0.05 mole) of piperidine. The contents of the flask was heated to gentle reflux and 21.2 grams (0.196 mole) of 2,4,6-octatriene dissolved in 40 milliliters of dry cyclohexane was added dropwise to the flask. A GLC analysis of the 2,4,6-octatriene mixture showed that it comprised 66 percent all trans; 31 percent cis,trans,trans; and 3 percent cis,cis,trans isomers. The same technique as described in Example I was used to recover the reaction mixture. The organic phase was distilled and the fraction collected between 80.5 and 82° C. at a pressure of 100 millimeters of mercury consisted of 16.6 grams of a mixture of isomers of methylcycloheptadiene. This represents a 78 percent yield based on the octatriene charge.

Example IV

About 0.1 gram (0.014 gram atoms) of finely cut lithium wire was reacted with about 5 milliliters (0.08 mole) of ethylenediamine for about 30 minutes at an elevated temperature. At the end of this period the blue color of the reaction mixture had disappeared and the resulting 2-aminoethyl-aminolithium catalyst was cooled to room temperature. A 30-gram mixture of isomeric octatrienes was then added dropwise, and the temperature rose to about 80° C. After the addition of the octatrienes was complete, the temperature rapidly returned to room temperature. The 30-gram mixture had previously been analyzed and found to consist of 27 grams of 1,3,6-octatriene, 2.7 grams of 1,3,7-octatriene, and 0.3 gram of vinylcyclohexane impurity. Small samples collected and analyzed periodically indicated that the reaction was substantially complete after about one hour. At this time the reaction mixture was hydrolyzed and the organic layer separated and distilled at a pressure of about 100 millimeters of mercury. The fractions collected at 70 to 80° C. and at 80 to 87° C. were analyzed and found to contain 5.8 grams of a mixture of isomers of methylcycloheptadiene and 6.35 grams of 2,4,6-octatriene. A residue of 13.7 grams appeared to be a polymerized material. The 5.8 grams of methylcycloheptadienes represent a 19 percent yield based on the octatriene charge. The 6.35 grams of the octatrienes recovered represent a 21 percent yield based on the octatriene charge. This example shows that the lithium salt of the diamine functions to cyclize and isomerize the acyclic triene compounds.

Example V

In order to illustrate the operability and utility of the catalyst of this invention for cyclizing branched acyclic triene compounds, the three-necked flask described in Example I was successively charged with 100 milliliters of dry cyclohexane and 5 milliliters of heptane containing 1.6 grams (0.016 mole) phenylsodium and 4.3 grams (0.05 mole) piperidine. The charged mixture was heated under reflux to form the piperidinosodium catalyst. The flask was then charged with 33.5 grams (0.31 moles) of 3-methyl-1,4,6-heptatriene dropwise and heat was applied to the flask for about one hour. Small samples were taken at 30 minute intervals and analyzed. This analysis showed that the reaction was substantially complete after 30 minutes. The reaction mixture was then cooled and the catalyst destroyed by hydrolysis. After washing the reaction product several times with water, the organic phase was separated and dried. The organic phase was then distilled at a pressure of about 100 millimeters of mercury. The following table shows the amount of material recovered for the various fractions.

TABLE I

| Fraction | Amount (g.) | Refractive Index |
|---|---|---|
| 1. 30°–47° C. (100 mm. Hg) | 5.3 | $n_D^{20}$ 1.4222 (solvent). |
| 2. 47°–81° C. (100 mm. Hg) | 2.4 | $n_D^{20}$ 1.4755. |
| 3. 81°–81.5° C. (100 mm. Hg) | 9.0 | $n_D^{20}$ 1.4961. |
| 4. 81.5°–82° C. (100 mm. Hg) | 10.3 | $n_D^{20}$ 1.4969. |
| 5. 82° (100 mm. Hg) | 3.7 | $n_D^{20}$ 1.4971. |
| 6. 73° C. (80 mm. Hg) | | |
| 7. Residue | 4.8 | |

Fraction 2 identified in Table I was analyzed by GLC and found to contain 1.6 grams of methylcycloheptadiene. Similarly, the residue was analyzed by GLC and found to contain one gram of methylcycloheptadiene. Fractions 3, 4, and 5 were also analyzed and found to consist of substantially pure isomeric methylcycloheptadienes. The total recovery of 25.6 grams represents a 76 percent yield based on the branched heptatriene starting material.

Example VI

Another run was made under conditions substantially identical to those described in Example V to illustrate the effectiveness of the catalyst for cyclizing branched acyclic trienes. In this run, the catalyst was formed by reacting 1.6 grams (0.016 mole) of phenylsodium with 4.3 grams (0.05 mole) of piperidine in 200 milliliters of cyclohexane. This reaction was effected in the three-necked flask by heating under reflux. The flask was then charged with 189 grams (1.75 moles) of 3-methyl-1,4,6-heptatriene in a dropwise manner over a period of two hours. The materials in the flask were refluxed during the addition of the triene starting material. The flask was heated at 80° C. for 95 minutes and then a sample was extracted. This sample was analyzed by GLC and found to contain no triene starting material. The reaction product was cooled, washed, and the organic phase separated and distilled as described in Example V. A total of 158.5 grams of a mixture of isomers of methylcycloheptadiene was recovered. This represents an 84 percent yield based on the triene starting material employed.

Example VII

To further illustrate the utility of the potassium salt of an amine for cyclizing a branched acyclic triene starting material, a run was made wherein one gram (0.0086 mole) of phenylpotassium dissolved in 10 milliliters of heptane was treated with 4.3 grams (0.05 mole) of piperidine. The reactants were charged to the flask described in Example I and heated under reflux for 30 minutes to promote formation of the piperidinopotassium catalyst. At the end of this time, 22.7 grams (0.21 mole) of 3-methyl-1,4,6-heptatriene was added dropwise. A slight warming of the mixture was observed. Samples were periodically removed and analyzed for the presence of the branched triene starting materials. At the end of 3½ hours, no starting material could be detected in the sample. The reaction mixture was then cooled, washed, separated, and distilled under a pressure of about 100 millimeters of mercury. Table II below outlines the various fractions and the amounts recovered.

TABLE II

| Fraction | Amount (g.) | Refractive Index |
|---|---|---|
| 1. 40°–80° (100 mm. Hg) | 6.4 | $n_D^{20}$ 1.4100. |
| 2. 80°–81° (100 mm. Hg) | 5.8 | $n_D^{20}$ 1.4955. |
| 3. 81° (100 mm.) | 0.6 | $n_D^{20}$ 1.4949. |
| 4. 75° (80 mm.) | | |
| 5. Residue | 13.6 | |

Yield was 6.4 g. or 28%.

The 6.4-gram yield of isomers of methylcycloheptadiene corresponds to a 28 percent yield based on the branched triene starting materials. The 13.6-gram yield of residue material appeared to be a polymerized product, thus indicating that the potassium piperidide converts the branched triene starting material to a polymer product.

Although the invention has been described in considerable detail, it must be understood that such description is for that purpose only and must not be considered limiting of the invention. Many variations and modifications can be made by one skilled in the art without departing from the spirit and scope thereof.

We claim:

1. A process for the conversion selected from cyclization and isomerization of an acyclic triene compound containing 7 to 12 carbon atoms per molecule, inclusive, to a compound containing the same number of carbon atoms per molecule as the acyclic triene compound starting material comprising contacting the acyclic triene compound under converting conditions in a conversion zone with a catalyst selected from the group consisting of amino alkali metal compounds characterized by the following structural formulas:

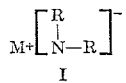 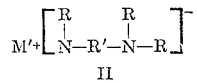

wherein M is an alkali metal selected from the group consisting of sodium and potassium and when M is potassium, the acyclic triene compound starting material contains hydrocarbon branches; M' is an alkali metal selected from the group consisting of lithium, sodium, and potassium; each R can be the same or different and is selected from the group consisting of a hydrogen atom and alkyl, aralkyl, and cycloalkyl radicals containing 1 to 10 carbon atoms and which can form a heterocyclic ring with the nitrogen atom to which they are attached; R' is selected from the group consisting of alkylene radicals having 2 to 12 carbon atoms, cycloalkylene radicals having 4 to 12 carbon atoms, and dialkylene substituted aromatic radicals having 8 to 20 carbon atoms; and recovering the compound containing the same number of carbon atoms per molecule as the acyclic starting material.

2. A process according to claim 1 wherein the acyclic triene compound is cyclized to a cycloheptadiene compound having one or more alkyl substituents containing the same number of carbon atoms in excess of seven in the acyclic triene starting material.

3. A process according to claim 2 wherein the catalyst is piperidinosodium.

4. A process according to claim 3 wherein the acyclic triene compound starting material contains hydrocarbon branches.

5. A process according to claim 4 wherein the acyclic triene starting material is 3-methyl-1,4,6-heptatriene and the cyclized reaction product is methylcycloheptadiene.

6. A process according to claim 1 wherein the catalyst is piperidinopotassium.

7. A process according to claim 1 wherein the catalyst is a lithium salt of a diamine and the acyclic triene compound isomerized to form a conjugated acyclic triene compound.

8. A process according to claim 7 wherein the catalyst is 2-aminoethylaminolithium.

9. A process according to claim 1 wherein the acyclic triene compound starting material is selected from the group represented by the following structural formulas:

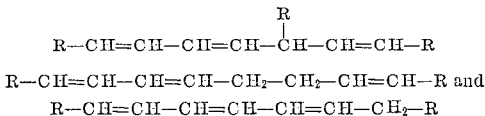

wherein each R can be the same or different and is selected from the group consisting of hydrogen and straight or branched chain alkyl radicals such that the total number of carbon atoms in the acyclic triene starting material is within the range of 7 to 12, inclusive; wherein the conversion is effected in the presence of a solvent which is normally liquid at ambient temperature and at substantially atmospheric pressure and is selected from the group consisting of amines and saturated and aromatic hydrocarbons containing 6 to 10 carbon atoms per molecule; wherein the conversion is conducted at a temperature within the range of about 10 to about 350° C. for a period of time within the range of about 10 minutes to about 24 hours or more; and wherein the mole ratio of the amino alkali metal catalyst to the acyclic triene starting material is in the range of about 0.001:1 to about 1:1.

10. A process according to claim 9 wherein the acyclic triene compound starting material is 1,3,6-octatriene; and wherein the catalyst is piperidinosodium.

References Cited

UNITED STATES PATENTS

| | | | |
|---|---|---|---|
| 2,836,629 | 5/1958 | Viola | 260—666 |
| 3,009,001 | 11/1961 | Crain et al. | 260—666 |
| 3,124,621 | 3/1964 | Crain et al. | 260—666 |
| 3,128,318 | 4/1964 | Meisinger | 260—683.15 |
| 3,154,595 | 10/1964 | Donaldson et al. | 260—683.2 |
| 3,329,739 | 7/1967 | Butte | 260—683.2 |

OTHER REFERENCES

Spangler, J. Org. Chem., 31, pp. 346–348, January 1966.

Bell, J. Polymer Sci., vol. 2, pt. A., pp. 5291–5303 and 5305–5312, 1964.

DELBERT E. GANTZ, *Primary Examiner.*

V. O'KEEFE, *Assistant Examiner.*